May 13, 1924.
A. B. S. LAIDLAW
SLIDING CLASP FASTENER
Filed Nov. 3, 1923
1,493,783
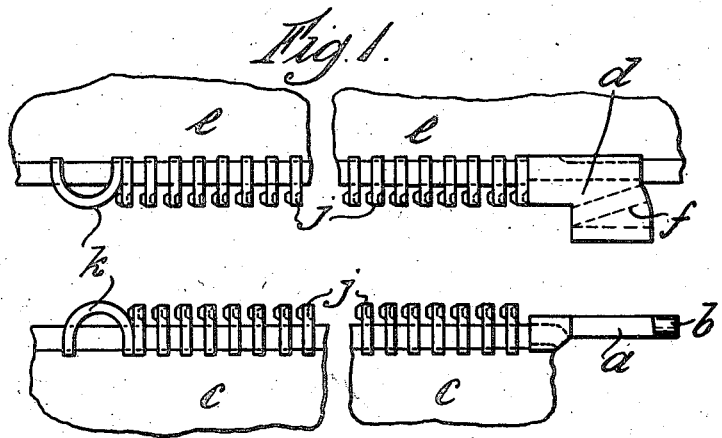
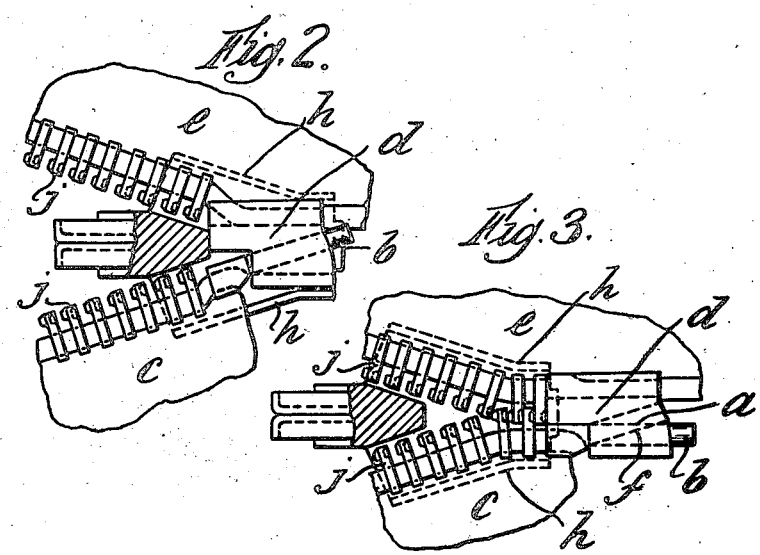
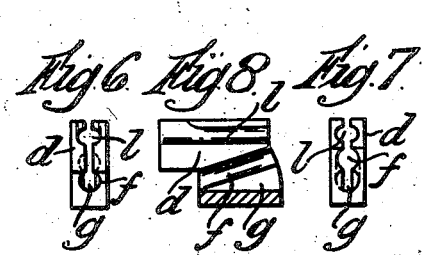
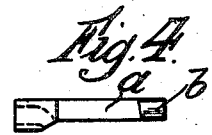
INVENTOR
A.B.S. LAIDLAW,
By his Attorneys, Patented May 13, 1924.

1,493,783

UNITED STATES PATENT OFFICE.

ALEXANDER BANNATYNE STEWART LAIDLAW, OF CAMBRIDGE, ENGLAND.

SLIDING CLASP FASTENER.

Application filed November 3, 1923. Serial No. 672,603.

*To all whom it may concern:*

Be it known that I, ALEXANDER BANNATYNE STEWART LAIDLAW, a subject of the King of Great Britain, residing at Pembroke College, Cambridge, England, have invented new and useful Improvements in Sliding Clasp Fasteners, of which the following is a specification.

This invention relates to fasteners consisting of two sets of teeth which are secured to the edges of the material to be fastened and provided with means whereby two entirely separate pieces of material may be secured together, and a cursor which causes the teeth to lock together.

According to this invention a stem having at one end a head, and whose other end is preferably of the thickness of the teeth, is scured to the material at one end of one set of teeth, and a socket adapted to be inserted into the cursor is secured at the corresponding end of the other set of teeth. In the socket is a slot inclined at an angle equal to half the entry angle of the cursor and of sufficient size to allow the head of the stem to pass through it. In communication with this slot is another slot of a size which allows the stem but not the head to pass through it, and whose end is the sector of a circle whose radius is equal to the length of the stem.

The parts are assembled together by running the cursor on to the socket and passing the head and stem into the unoccupied leg of the cursor and through the larger slot. The forwad motion of the cursor then turns the stem into the smaller slot so that the head bears against the end of the socket and securely holds the two pieces of material together.

The accompanying drawings illustrate fasteners made in accordance with this invention. Figure 1 is a plan showing two pieces of fabric apart. Figure 2 is a plan showing the stem inserted into the slot in the socket and Figure 3 is also a plan in which the cursor has been moved a short distance. Figures 4 and 5 are a side elevation and plan of the stem and Figures 6, 7 and 8 are end elevations and a section respectively of the socket.

A stem $a$ having a head $b$ is secured to one piece of the material $c$ and a socket $d$ is secured to another piece of material $e$ whose corded edge passes into a groove $l$. In the socket $d$ is a slot $f$ of sufficient size to allow the head $b$ of the stem $a$ to pass through and the slot $f$ communicates with another slot $g$ of such a size that the stem $a$ can pass but not the head $b$ so that when the stem is turned the head $b$ engages with the end of the socket $d$ which end is a sector of a circle whose radius is equal to the length of the stem $a$. $h$ is a cursor of ordinary construction by which the teeth $j$ on the two pieces of fabric $c$ and $e$ are caused to interlock and $k$ are loops secured to the fabric at the ends of the rows of teeth. One of the loops $k$ is made large enough to prevent the cursor from becoming disengaged and lost.

In operation the parts $c$ and $e$ of the fabric are assembled together by running the cursor $h$ on to the socket $d$ and passing the head $b$ and stem $a$ into the unoccupied leg of the cursor $h$ and through the slot $f$. The forward motion of the cursor $h$ then turns the stem $a$ into the smaller slot $g$ so that the head $b$ bears against the end of the socket $d$ and securely holds the two pieces of material together.

What I claim is:—

1. Fasteners for connecting two pieces of material consisting of two sets of teeth, one set secured to one piece and the other to the other piece, a stem secured to one piece parallel with its edge, a head in the stem, a socket secured to the other piece, a slot in the socket adapted to allow the passage of the head of the stem and means for retaining the stem in the socket.

2. Fasteners for connecting two pieces of material consisting of two sets of teeth, one set secured to one piece and the other to the other piece, a stem secured to one piece parallel with its edge, a cylindrical head on the stem, a socket secured to the other piece, a cylindrical slot in the socket of greater diameter than the head and means for retaining the stem in the socket.

3. Fasteners for connecting two pieces of material consisting of two sets of teeth, one set secured to one piece and the other to the other piece, a stem secured to one piece parallel with its edge, a head on the stem, a socket secured to the other piece, a slot in the socket adapted to allow the passage of the head of the stem, and another slot in the socket which does not allow of the passage of the head.

4. Fasteners for connecting two pieces of material consisting of two sets of teeth, one set secured to one piece and the other to the other piece, a stem secured to one piece parallel with its edge, a cylindrical head on the stem, a socket secured to the other piece, a cylindrical slot in the socket of greater diameter than the head, and another cylindical slot in the socket of smaller diameter than the head.

In testimony that I claim the foregoing as my invention I have signed my name this 9th day of October, 1923.

ALEXANDER BANNATYNE STEWART LAIDLAW.